(12) United States Patent
Chen (10) Patent No.: US 11,491,761 B2
(45) Date of Patent: Nov. 8, 2022

(54) COLORFUL BOARD STRUCTURE AND MANUFACTURING METHOD THEREOF

(71) Applicant: PrintGoal Technology Co., LTD., New Taipei (TW)

(72) Inventor: Ying-Chieh Chen, Taipei (TW)

(73) Assignee: PRINTGOAL TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/569,651

(22) Filed: Sep. 12, 2019

(65) Prior Publication Data

US 2020/0171877 A1 Jun. 4, 2020

(30) Foreign Application Priority Data

Nov. 29, 2018 (TW) .................................. 107142805

(51) Int. Cl.
*B32B 7/12* (2006.01)
(52) U.S. Cl.
CPC ............ *B32B 7/12* (2013.01); *B32B 2255/10* (2013.01); *B32B 2255/26* (2013.01)
(58) Field of Classification Search
CPC .... B32B 7/12; B32B 2255/10; B32B 2255/26
USPC ....................................................... 428/195.1
See application file for complete search history.

(56) References Cited

U.S. PATENT DOCUMENTS

| 8,465,804 B2 | 6/2013 | Provoost et al. |
| 2005/0069686 A1* | 3/2005 | Hoops ................... B44C 1/1704 428/201 |
| 2007/0065583 A1 | 3/2007 | Chiou |
| 2007/0141328 A1 | 6/2007 | Kamiyama |
| 2009/0096372 A1* | 4/2009 | Menotti ................. G09F 3/0291 313/506 |
| 2009/0252925 A1 | 10/2009 | Provoost et al. |
| 2011/0076486 A1* | 3/2011 | McGee ................... B32B 15/18 428/336 |
| 2016/0221359 A1 | 8/2016 | Till |
| 2020/0171877 A1* | 6/2020 | Chen ..................... B29C 64/112 |

FOREIGN PATENT DOCUMENTS

| CN | 201872518 U | 6/2011 |
| CN | 102120400 A | 7/2011 |
| CN | 102686692 A | 9/2012 |
| DE | 102009044802 A1 | 12/2011 |
| EP | 2051225 A2 | 4/2009 |
| EP | 2108524 A1 | 10/2009 |
| EP | 2189272 A2 | 5/2010 |
| JP | 2007-249028 A | 9/2007 |
| JP | 2013-506034 A | 2/2013 |

(Continued)

*Primary Examiner* — Betelhem Shewareged
(74) *Attorney, Agent, or Firm* — Cheng-Ju Chiang (57) ABSTRACT

The present invention discloses a colorful board structure comprising a transparent substrate, an adhesive layer, a three-dimensional painted layer and a protective layer. The three-dimensional painted layer includes at least one colored layer and at least one transparent stacking layer including at least one raised part. The aforementioned colorful board structure is made of a multi-layer structure, and has the advantages of enhancing the stereoscopic effect of the pattern and the color expression. In addition, a manufacturing method of the colorful board structure is also disclosed.

7 Claims, 8 Drawing Sheets

(56) References Cited

FOREIGN PATENT DOCUMENTS

| | | |
|---|---|---|
| JP | 2015-171811 A | 10/2015 |
| KR | 10-2009-0122782 A | 12/2009 |
| KR | 10-2010-0098089 A | 9/2010 |
| TW | 201829210 A | 8/2018 |
| WO | 2015/036588 A1 | 3/2015 |

* cited by examiner

COLORFUL BOARD STRUCTURE AND MANUFACTURING METHOD THEREOF

TECHNICAL FIELD

The present invention relates to a colorful board structure and manufacturing method thereof, particularly, to a colorful board structure and manufacturing method which can strengthen the three-dimensional sense of pattern and color performance through multiple levels structure.

BACKGROUND OF RELATED ARTS

Among the existing painted decorations, take art glass (with glass as the base of decorations) as an example, they generally include art glass ornaments with different processing methods, such as hot-melt glass, patch glass, screen printing glass and coating (painting) glass. However, the above artistic glasses have various drawbacks.

The disadvantage of hot-melt glass is that it needs high energy consumption. Generally speaking, it needs at least 900° C. high temperature to deform the base glass to show three-dimensional effect. In the process of hot-melt glass processing, as the temperature is not properly controlled, the thickness of the glass after hot-melt will be uneven; and as air enters carelessly during heating, it is likely to cause seam in the glass such that the finished product is easy to crack.

Patch glass is made by glass blocks with various shapes, patterns and colors adhered to the surface of the base glass by an adhesive material to show its artistic effect. However, it exists drawback that the decorated glass blocks are easy to fall off after adhesive material aging.

Screen printing glass can create effects of one-plate with one color and multi-colors registration, but its color is dull and the processing is complicated. Painted glass is only applicable to cabinet door and other indoor decoration due to lack of transmission of primer pigments, and its development is relatively limited.

SUMMARY

To resolve the drawbacks of the prior arts, the present invention discloses a colorful board structure and manufacturing method which can strengthen the three-dimensional sense of pattern and color performance through multiple levels structure. The colorful board structure includes a transparent substrate, an adhesive layer, a three-dimensional color-painted layer and a protection layer.

The present transparent substrate is a glass substrate. The adhesive layer is covered on the transparent substrate to form a planar surface. The three-dimensional color-painted layer is formed on the planar surface of the adhesive layer. The three-dimensional color-painted layer includes at least one transparent banked layer and at least one coloring layer. The protection layer is covered on the three-dimensional color-painted layer to form the colorful board structure. A cross-linking agent is added into the adhesive layer to enhance the adhesion between the adhesive layer and the three-dimensional color-painted layer.

The method for fabricating the above-mentioned colorful board structure comprises the followings. Firstly, the step (a) is performed, providing a transparent substrate, in which material of the transparent substrate is selected from a material with high light transmittance such as glass. Next, in the step (b), it performs a process of covering an adhesive layer on the transparent substrate to form a planar surface, and hardening the adhesive layer.

Subsequently, in the step (c), it performs a process of covering a three-dimensional color-painted layer on the adhesive layer, wherein the three-dimensional color-painted layer includes at least one transparent banked layer and at least one coloring layer, and each of the at least one transparent banked layer includes at least one raised part. Finally, in the step (d), it performs a process of covering a protective layer on the three-dimensional color-painted layer to form the colorful board structure.

Embodiments of the invention are illustrated by way of example, and not by way of limitation, in the figures of the accompanying drawings in which like reference numerals refer to similar elements.

DETAILED DESCRIPTION OF THE INVENTION

In order to understand the technical features and practical efficacy of the present invention and to implement it in accordance with the contents of the specification, hereinafter, preferred embodiments of the present invention will be described in detail with reference to the accompanying drawings.

Figure 1A:
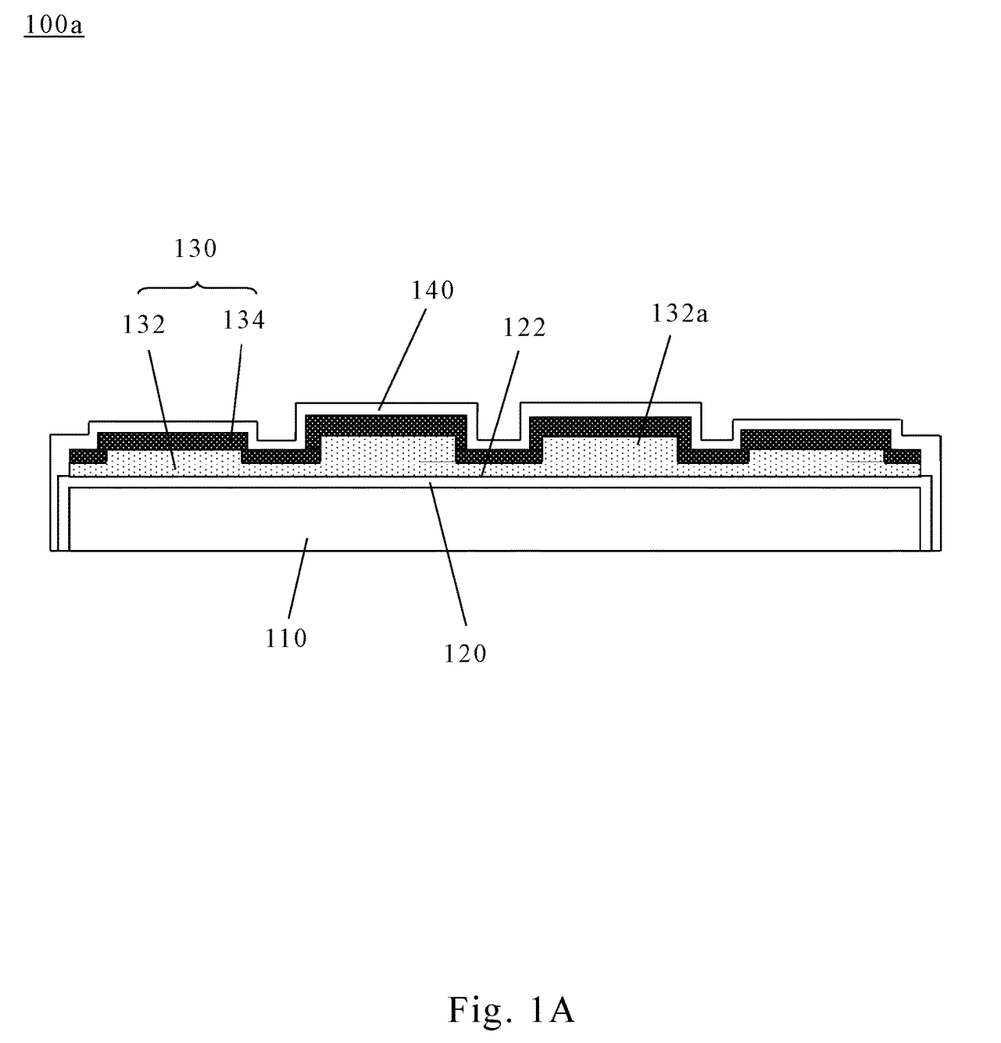
FIG. 1A illustrates a schematic diagram of a colorful board structure according to first embodiment of the present invention.

Firstly, please refer to FIG. 1A, it illustrates a schematic diagram of a colorful board structure according to the first embodiment of the present invention. As shown in FIG. 1A, the colorful board structure 100a in this embodiment includes a transparent substrate 110, an adhesive layer 120, a three-dimensional color-painted layer 130 and a protection layer 140.

Material of the transparent substrate 110 can be selected from sapphire, glass ($SiO_2$), quartz, ceramic, epoxy, acrylate, polyimide, zinc oxide (ZnO), aluminum nitride (AlN), silicon carbide (SiC), or a material with high light transmittance. Moreover, although the above materials can be applied to the transparent substrates 110, the glass substrate is the most prominent for the transparent substrate 110 which have the functions of fireproof and chemical resistance. Therefore, the following implementation will be explained on the basis of the glass substrate.

In addition, at least one magnetic material can be added into the transparent substrate 110, which can be either hard magnetic material (permanent magnetic material) or soft magnetic material. After magnetization by external magnetic field, hard magnetic material can retain a portion or most of the original magnetization direction even under a considerable reverse magnetic field. Hard magnetic materials are mainly classified into three types of alloys, ferrites and intermetallic compounds. Among them, alloys include casting, sintering or processing alloys; the casting alloys include AlNi (Co), FeCr (Co), FeCrMo, FeAlC or FeCo (V) (W), the sintered alloys include Re—Co (Re indicates rare earth elements), Re—Fe, AlNi (Co) or FeCrCo, and the processing alloys include FeCrCo, PtCo. MnAlC, CuNiFe or AlMnAg. The main component of ferrite is MO. $6Fe_2O_3$, M represents Ba, Sr, Pb or SrCa, LaCa, other composite components. The intermetallic compound is mainly represented by MnBi.

The adhesive layer 120 is coated on the transparent substrate 110 to form a planar surface 122. If the thickness of the adhesive layer 120 is not uniform, it is likely to cause adhesion incomplete or mottling of three-dimensional color-painted layer 130. The surface state contacted by the three-dimensional color-painted (painting) layer 130 will affect its adhesion ability. Therefore, if the surface of the adhesive layer 120 is uneven after the process of coating, it will seriously affect the adhesion ability of the three-dimensional color-painted layer 130.

In some embodiment, material of the adhesive layer 120 may choose urea formaldehyde (UF) resin, phenolic-formaldehyde (PF) resin, rubber, epoxy resin, polyvinyl acetate (PVAc) or the combination thereof. In the preferred embodiment, the material of the adhesive layer 120 is polyvinyl acetate. The material of the adhesive layer 120 depends on the material of the transparent substrate 110 and the three-dimensional color-painted layer 130.

The three-dimensional color-painted layer 130 of the present embodiment is mainly formed on the planar surface 122 of the adhesive layer 120. Furthermore, the three-dimensional color-painted layer 130 is spray painting on the adhesive layer 120 through a digital inkjet printing machine.

It should be noted that the three-dimensional color-painted layer 130 of the present embodiment includes a transparent banked layer 132 and a coloring layer 134 formed on the transparent banked layer 132, and the transparent banked layer 132 has at least one raised part 132a. Specifically, the digital inkjet printing machine is used to spray a transparent material on the planar surface 122 of the adhesive layer 120 according to a stereo structure of the three-dimensional (stereo) pattern set by the computer (application program) to form the transparent banked layer with at least one raised part 132a (that is, the stereo structure). In addition, after the spraying process of the transparent banked layer 132, the digital inkjet printing machine sprays a pigment on the transparent banked layer 132 according to a pattern color (distribution) of the three-dimensional pattern to form the coloring layer 134. Thus, the pattern presented by the three-dimensional color-painted layer 130 has the effect of three-dimensional relief. As the drop height of each raised part 132a on the transparent banked layer 132 is changed, the pattern with hierarchical sense and rich color can be produced.

Material of the transparent banked layer 132 can be polyurethane paint, natural lacquer paint or epoxy resin, as well as transparent materials such as urea formaldehyde (UF) resin, phenol-formaldehyde (PF) resin, rubber, epoxy resin or polyvinyl acetate (PVAc) which is selected by the adhesive layer 120. The present invention does not limit the material of the transparent banked layer 132 as long as the three-dimensional color-painted layer 130 have the same visual and tactile effects as the relief pattern.

The pigment applied in the coloring layer 134 may be water-based ink, oil-based ink, non-permeable ink or permeable ink, and the present invention should not be limited to these. Among them, the oil-based ink is preferred in this embodiment.

A cross-linking agent can also be added into the adhesive layer 120 of the present embodiment to enhance the adhesion between the adhesive layer 120 and the three-dimensional color-painted layer 130. The cross-linking agent is selected from isocyanate series compounds, epoxy series compounds, amine series compounds or peroxide, which can be chosen according to the different materials of the adhesive layer 120 and the three-dimensional color-painted layer 130. The function of the cross-linking agent is to increase the chemical bonding ability between the adhesive layer 120 and the three-dimensional color-painted layer 130. The cross-linking agent is to cross-link the main chain molecules of materials, so that multiple linear molecules are bonded with each other to form covalent bonds or ionic bonds and cross-link them to be network structures, thereby improving the adhesion between the adhesive layer 120 and the three-dimensional color-painted layer 130.

Finally, the protection layer 140 is covered on the three-dimensional color-painted layer 130 to form the color-painted substrate (colorful board) structure 100a of the present embodiment.

In addition, the transparent substrate 110 of the present embodiment includes four sides, and the protection layer 140 or the adhesive layer 120 can completely cover the four sides of the transparent substrate 110. Thus, the color-painted substrate structure 100a will be more robust based-on this embodiment, and it can prevent from cracking or damage caused by impacting in the process of handling or disassembling the color-painted substrate structure 100a.

In this embodiment, a material of the adhesive layer 120 or the protective layer 140 may be polyurethane paint, natural lacquer paint or epoxy resin. Furthermore, in some embodiments, the adhesive layer 120 or the protective layer 140 may also contain hardening agent or cross-linking agent. For example, the adhesive layer 120 may be mixed with a specific proportion of the cross-linking agent (e.g. 10-40% weight percentage) which will precipitate in the adhesive layer due to different density. The mixing of the adhesive layer 120 and the cross-linking agent of the present embodiment can be carried out by spraying, digital spraying, screen printing, mask spraying or scraper planar coating, etc.

In the treatment of the adhesive layer 120 and the protection layer 140, due to involving in hardening, as the adhesive layer 120 or the protection layer 140 contains a hardening agent, a light hardening agent or a thermal hardening agent can be selected according to the practical requirements. The physical properties of optical effect of hardened polyurethane paint, natural lacquer paint or epoxy resin depend on the composition and proportion of hardening agent.

Subsequently, please refer to FIG. 1B, it illustrates a schematic diagram of the color-painted substrate structure according to one another embodiment of the present invention. In this embodiment, the color-painted substrate structure 100b includes a transparent substrate 110, an adhesive layer 120, a three-dimensional color-painted layer 130 and a protective layer 140. The difference from the color-painted substrate structure 100a in the first embodiment of the present invention (refer to FIG. 1A) is that the spraying sequence of the color-painted layer 134 and the transparent stack layer 132 is opposite in the three-dimensional color-painted layer 130 of the present embodiment.

The three-dimensional color-painted layer 130 of the present embodiment includes a coloring layer 134 and a transparent banked layer 132 formed on the coloring layer 134, and the transparent banked layer 132 has at least one raised part 132a. Specifically, a digital inkjet printing machine is used to spray a pigment onto a planar surface 122 of the adhesive layer 120 to form a coloring layer 134 according to a stereo structure of the three-dimensional (stereo) pattern set by the computer (application program). In addition, after the spraying process of the coloring layer 134, the digital inkjet printing machine sprays a pigment on the coloring layer 134 according to a stereo structure of the three-dimensional pattern to form the transparent banked layer 132 with at least one raised part 132a (that is, the stereo structure). Thus, the pattern presented by the three-dimensional color-painted layer 130 has the effect of three-dimensional relief. As the drop height of each raised part 132a on the transparent banked layer 132 is changed, the pattern with hierarchical sense and rich color can be produced.

Finally, the protection layer 140 is also covered on the three-dimensional color-painted layer 130, which forms the color-painted substrate structure 100b of the present embodiment.

Figure 1B:
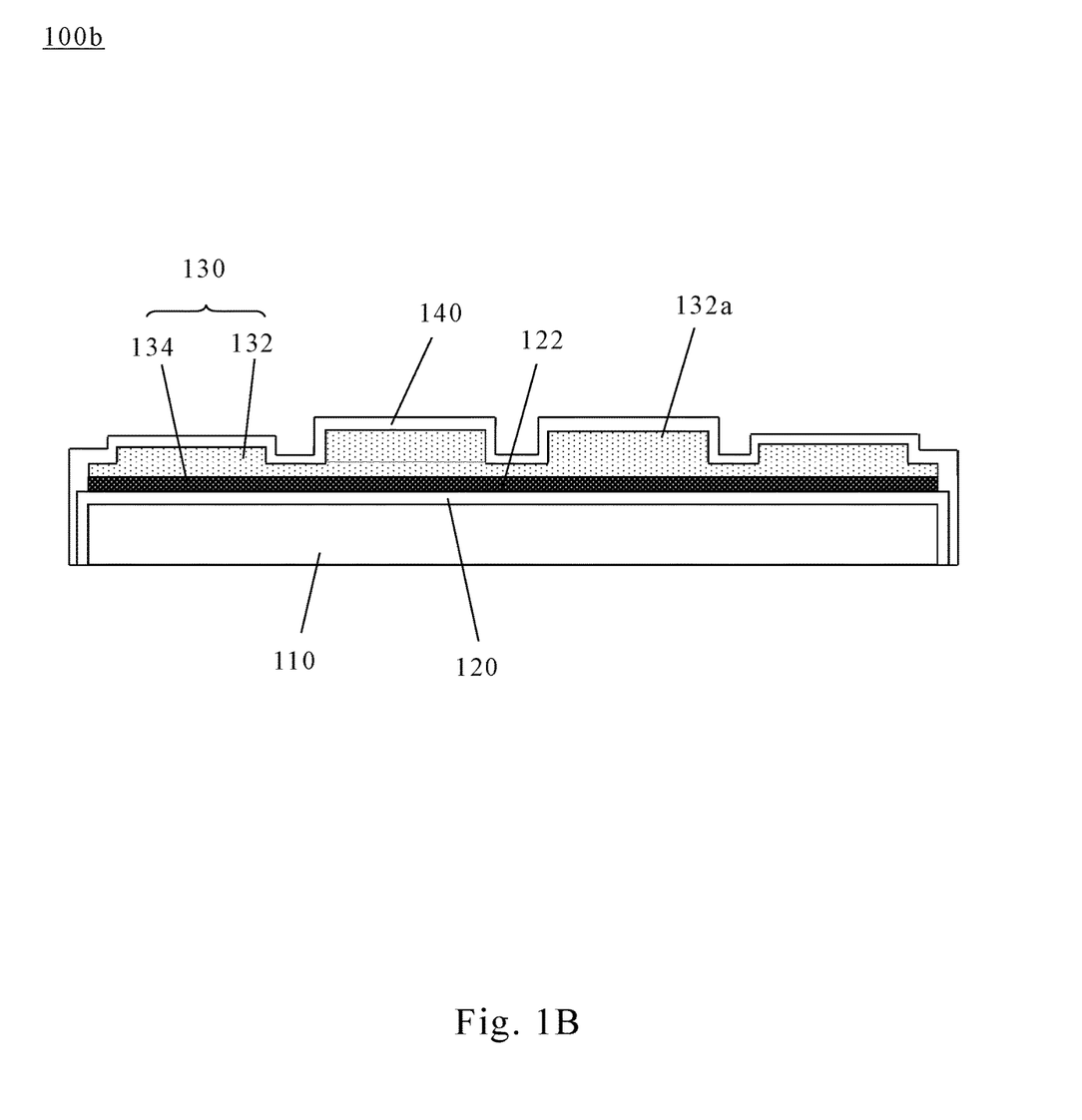
FIG. 1B illustrates a schematic diagram of a colorful board structure according to second embodiment of the present invention.
Figure 2:
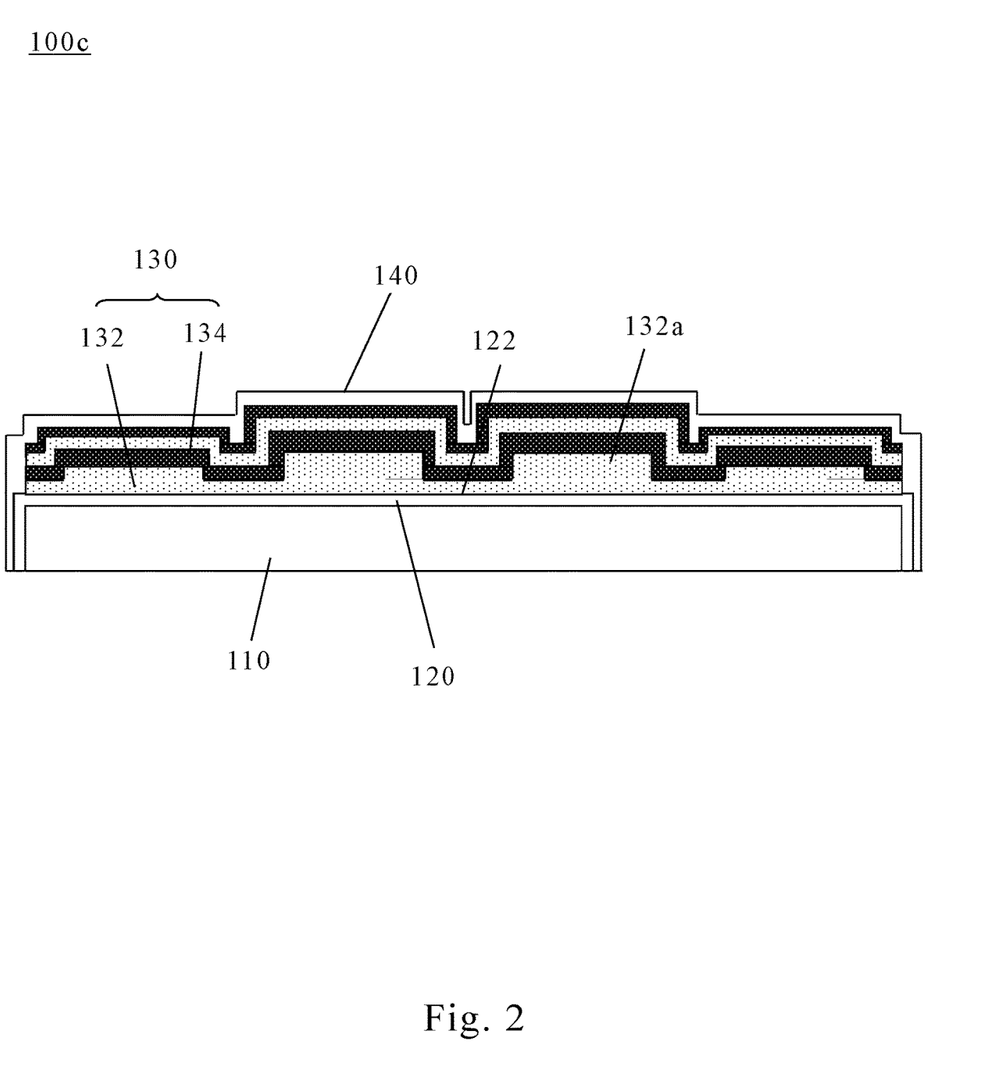
FIG. 2 illustrates a schematic diagram of a colorful board structure according to third embodiment of the present invention.

In addition, please refer to FIG. 2, which is a schematic diagram of the color-painted substrate structure according to the third embodiment of the present invention. In this embodiment, the color-painted substrate structure 100c also includes a transparent substrate 110, an adhesive layer 120, a three-dimensional color-painted layer 130 and a protective layer 140. The difference between the color-painted substrate structure 100a, 100b (referring to FIGS. 1A and 1B) in the first and second embodiment of the present invention is that there are a plurality of coloring layers 134 and a plurality of transparent banked layers 132 in the three-dimensional color-painted layer 130 of the present embodiment, and each of the plurality of coloring layers 134 interlaces for stacking with each of the plurality of transparent banked layers 132.

In the three-dimensional color-painted layer 130 of the present embodiment, the three-dimensional color-painted layer 130 is stacked in order by a transparent banked layer 132, a coloring layer 134, a transparent banked layer 132 and a coloring layer 134, and each transparent banked layer 132 has at least one raised part 132a. The stacking height (number of layers) can be adjusted according to the user's demands. In other embodiments, the three-dimensional color-painted layer 130 can also be stacked in order by a first coloring layer 134, a first transparent banked layer 132, a second coloring layer 134 and a second transparent banked layer 132 (not shown), and each transparent banked layer 132 has at least one raised part 132a. Similarly, the stacking height (number of layers) can also be adjusted according to practical applications. The effect of stacking multiple transparent banked layers 132 and coloring layers 134 is that the stacking of multiple coloring layers 134 with different color can improve the color performance of the color-painted substrate, while the transparent banked layer 132 formed above or below the coloring layer 134 can effectively increase the stereoscopic sense of the substrate and make the pattern on the color-painted substrate more vivid.

In the first embodiment and the second embodiment (FIG. 1A, FIG. 1B), at least one optical material can be added to the transparent banked layer 132 and the protection layer 140 of the color-painted substrate structure. The at least one optical material can be quantum dot material, photoluminescence material, fluorescent material or the combination thereof, so that the color-painted substrate structure of the present invention has luminescent effect.

Specifically, the quantum dot material includes optical core, inorganic ligand layer and water-oxygen barrier layer. The optical core can be quantum dots made of semiconductor materials, such as II-VI group quantum dots (CdSe or CdS), III-V group quantum dots ((Al, In, Ga)P, (Al, In, Ga)As or (Al, In, Ga)N), II—VI group quantum dots (CdSe/ZnS) with shell-core structure, III-V group quantum dots (InP/ZnS) with shell-core structure, and non-spherical II-V group quantum dots (ZnCdSeS) with alloy structure, or the combination thereof.

The inorganic ligand layer is coated on the surface of the optical core, and the inorganic ligand layer contains at least one silicon oxide ($SiO_x$) material. In this preferred embodiment, the thickness of the silicon oxide ($SiO_x$) material is between 1 nanometer (nm) and 1000 nanometer, such as 10 to 100 nanometers. The silicon oxide ($SiO_x$) material can be silicon dioxide ($SiO_2$) or silicon oxide (SiO). It should be noted that the light output efficiency from at least one quantum dot will not be reduced, the loss of ligand of the quantum dot can be reduced and the quantum efficiency be improved as silicon dioxide ($SiO_2$) with high transmittance is used. At the same time, it can prevent photooxidation of quantum dots.

In addition, in the quantum dot material, a surface of the inorganic ligand layer is coated with an oxygen-water barrier layer. The oxygen-water barrier layer includes of a stacking layers structure having at least one metal oxide, which is stacked in an irregular arrangement. This can effectively reduce the poor dispersion of the nanostructure of the quantum dots (optical core) in the cured polymer materials due to the inorganic ligand layer. The at least one metal oxide is titanium oxide ($IiO_2$), zinc oxide (ZnO), alumina ($AlO_x$) or the combination thereof.

Fluorescent material includes inorganic fluorescent material or organic fluorescent material. The inorganic fluorescent material includes aluminate fluorescent powder (such as LuYAG, GaYAG, YAG), silicate fluorescent powder, sulfide fluorescent powder, nitride fluorescent powder, fluoride fluorescent powder, potassium fluosilicate (KSF) containing tetravalent manganese ions, etc. The organic fluorescent material includes single-molecule structure, multi-molecule structure, oligomer or polymer. The fluorescent material consists of main crystal, coactivator (sensitizer) and activator. The fluorescent material can be yellow, blue, green, orange, red or the combination thereof, such as yellow-orange and red-yellow nitride fluorescent powder. The material of the fluorescent material is selected from organic fluorescent powder, fluorescent pigment, inorganic fluorescent powder, radioactive element or the combination thereof.

Figure 3:
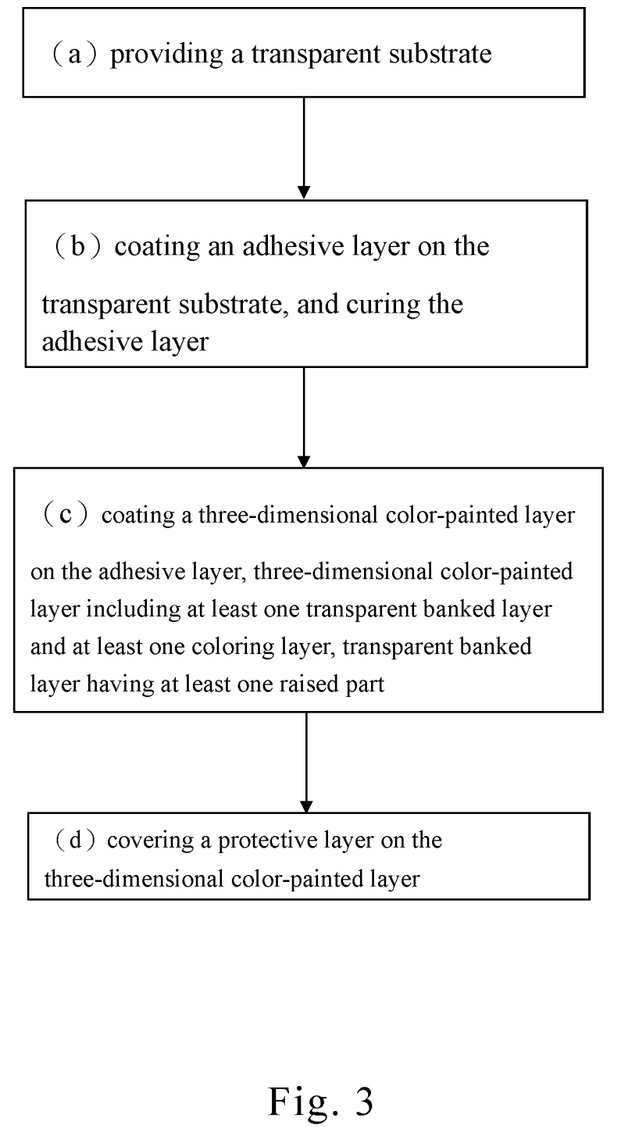
FIG. 3 illustrates a flow chart of manufacturing the colorful board structure according to one embodiment of the present invention.

Please also refer to FIG. 3, which is a flowchart of the method for fabricating the colorful board structure (color-painted substrate structure) according to the first to third embodiments of the present invention.

As shown in FIG. 3, it illustrates the fabrication method of the color-painted substrate structures 100a and 100b of the first to third embodiments of the present invention (referring to FIG. 1A, FIG. 1B and FIG. 2). Firstly, a transparent substrate 110 is provided by executing the step (a). Material of the transparent substrate 110 can be selected from sapphire, glass ($SiO_2$), quartz, ceramic, epoxy, acrylate, polyimide, zinc oxide (ZnO), aluminum nitride (AlN), silicon carbide (SiC) or material with high transmittance. Then, in the step (b), an adhesive layer 120 is coated on the transparent substrate 110 to form a planar surface 122 and hardened by a curing (hardening) process. The curing (hardening) process in the step (b) can be performed by a light hardening or heat hardening in which curing agent is added into the adhesive layer 120. After hardening of the adhesive layer, the step (c) is executed, in which a three-dimensional color-painted layer 130 is coated on the adhesive layer 120. The three-dimensional color-painted layer 130 comprises at least one transparent banked layer 132 and at least one coloring layer 134, in which each transparent banked layer 132 has at least one raised part 132a.

In the step (c), the color and pattern of three-dimensional color-painted layer 130 can be obtained by spraying according to user's setting, and the spraying sequence and number of layers of the transparent banked layer 132 and the coloring layer 134 can also be set according to user's requirements. For example, the transparent banked layer 132 with at least one raised part (relief part) 132a is sprayed on the planar surface 122 of the adhesive layer 120, and then the coloring layer 134 is sprayed on the transparent banked layer 132, which will make the color and pattern of the three-dimensional color-painted layer 130 more stereo and eye-catching (i.e. the color-painted substrate structure 100a of the first embodiment); as the coloring layer 134 is sprayed on the planar surface 122 of the adhesive layer 120, and then the transparent banked layer 132 with at least one raised part (relief part) 132a is sprayed on the coloring layer 134, it can prevent the coloring layer from falling off when the user touches the color-painted substrate (i.e. the color-painted substrate structure 100b of the first embodiment). In other embodiments, the three-dimensional color-painted layer 130 may also be formed by stacking in order of a coloring layer 134, a transparent banked layer 132, a coloring layer 134 and a transparent banked layer 132.

Subsequently, the step (d) is performed for covering a protective layer 140 on the three-dimensional color-painted layer 130 to complete the fabrication of the color painting substrate structures 100a and 100b according to the first and second embodiments of the present invention. The configuration of the protection layer 140 can be change according to the pattern of the three-dimensional color-painted layer 130. For example, the protection layer 140 is formed on the raised part of the three-dimensional color-painted layer 130 (i.e. the raised part 132a of the transparent banked layer) to highlight the hierarchical sense of the three-dimensional color-painted layer 130. Moreover, the protection layer 140 can fill the depression area of the three-dimensional color-painted layer 130 such that the protection layer 140 and the raised part of the three-dimensional color-painted layer 130 (i.e. the raised part 132a of the transparent banked layer) have an identical level to produce a planar layer with different effect. In addition, the protective layer 140 of the present embodiment has the functions of waterproof, chemical resistance, scratch resistance and anti-ultraviolet. It is helpful to keep bright and non-fading of the stereo pattern presented by the three-dimensional color-painted layer 130.

Furthermore, at least one the transparent banked layer 132 and the protection layer 140 includes at least one optical material, which may be a quantum dot material, a noctilucent material, a fluorescent material or the combination thereof. The optical material can be formed on the surface of at least one the transparent banked layer 132 or the protection layer 140 by a liquid atomizer, or doping in at least one the transparent banked layer 132 or the protection layer 140, or by a spin coating process and a photolithography process to cover the optical material on at least one the transparent banked layer 132 or the protection layer 140 to obtain a specific pattern of the optical material deposition.

Figure 4A:
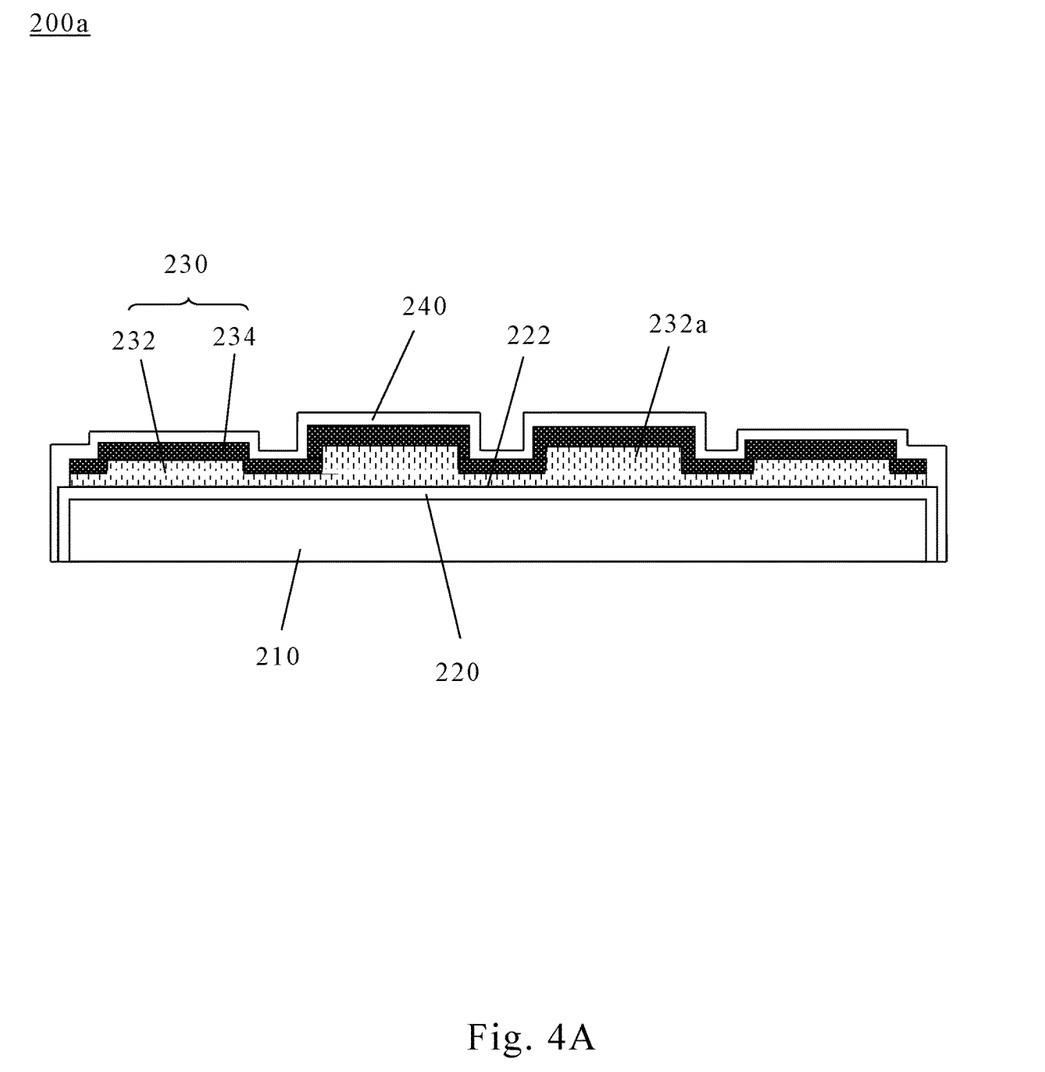
FIG. 4A illustrates a schematic diagram of a colorful board structure according to fourth embodiment of the present invention.

In addition to the first and second embodiments mentioned above, the base of the color-painted substrate structure of the present invention can also use a metal substrate. Referring to FIG. 4A, it illustrates the color-painted substrate structure of the fourth embodiment of the present invention. As shown in FIG. 4A, the color-painted substrate structure 200a of the fourth embodiment comprises a metal substrate 210, an adhesive layer 220, a three-dimensional color-painted layer 230 and a protective layer 240.

The metal substrate 210 as the base can be selected from gold (Au), silver (Ag), copper (Cu), iron (Fe), aluminum (Al), stainless steel or galvanized steel sheet and other metal materials. It can also mix metals with different characteristics or their alloys in the manufacturing process to increase the wear resistance of the metal substrate 210. In addition, a surface treatment layer can be formed on the surface of the metal substrate 210 by means of scraping, cutting or electroplating. The surface treatment layer has a planar surface, concave and convex (raised part) surface, a glossy surface, a matte surface or the combination thereof.

In addition, at least one magnetic material can be added to the metal substrate 210. The magnetic material can be either hard magnetic material (permanent magnetic material) or soft magnetic material.

The adhesive layer 220 is coated on the metal substrate 210 to form a planar surface 222. Because the surface of the metal substrate 210 may have been processed to form a concave-convex surface treatment layer, the thickness of the adhesive layer 220 coated on the metal substrate 210 should be higher than that of all the surface treatment layers to form the planar surface 222. If the thickness of the adhesive layer 220 is not uniform, it is likely to cause incomplete or mottled of the three-dimensional color-painted layer 230. The surface state contacted by the three-dimensional color-painted layer 230 will affect its adhesion ability. Therefore, if the surface of the adhesive layer 220 is uneven in the process of coating, it will seriously affect the adhesion ability of the three-dimensional color-painted layer 230.

The adhesive layer 220 may be selected in this embodiment as urea formaldehyde (UF) resin, phenolic-formaldehyde (PF) resin, rubber, epoxy resin, polyvinyl acetate (PVAc) or the combination thereof. In the preferred embodiment, the material of the adhesive layer 120 is polyvinyl acetate, and the material of the adhesive layer 120 depends on the material of the metal substrate 210 and the three-dimensional color-painted layer 230, which is not limited by the present invention.

The three-dimensional color-painted layer 230 of the present embodiment is mainly formed on the planar surface 222 of the adhesive layer 220. Furthermore, the three-dimensional color-painted layer 230 is sprayed on the adhesive layer 220 through a digital spray printer.

It should be noted that the three-dimensional color-painted layer 230 of the present embodiment includes a banked layer 232 and a coloring layer 234 formed on the banked layer 232, and the banked layer 232 has at least one raised part 232a. Specifically, the digital inkjet printing machine is used to spray a material of the banked layer 232 on the planar surface 222 of the adhesive layer 220 according to a stereo structure of the three-dimensional (stereo) pattern set by the computer (application program) to form the banked layer with at least one raised part 132a (that is, the stereo structure). In addition, after the spraying process of the banked layer 232, the digital inkjet printing machine sprays a pigment on the banked layer 232 according to a pattern color (distribution) of the three-dimensional pattern to form the coloring layer 234. Thus, the pattern presented by the three-dimensional color-painted layer 230 has the effect of three-dimensional relief. As the drop height of each raised part 232a on the banked layer 232 is changed, the pattern with hierarchical sense and rich color can be produced.

Material used in the banked layer 232 is a white coating formed by opaque white paint or transparent clear polishing paint, or the banked layer 232 is a clear polishing paint layer. When white paint is used to form a white coating on the banked layer 232, the coloring layer 234 sprayed on the white coating will be lighter than that of the coloring layer 234 without spraying on the white coating, and the effect is similar to that of extinction or matte. Also, a clear polishing paint (i.e. bright paint) such as water-based polyurethane polyester paint and oil-based polyurethane paint, natural lacquer or epoxy resin are used on the banked layer 232 to form a clear polishing paint coating, which can increase the color and brightness of color-painted substrates, and it is not easy to leave fingerprint or dirt mark when finger is applied.

The pigment used in the coloring layer 234 can be water-based ink, oil-based ink, non-permeable ink or permeable ink, and the present invention does not be limited to these. The oil-based ink is used in this embodiment.

A cross-linking agent can also be added into the adhesive layer 220 of the present embodiment to enhance the adhesion between the adhesive layer 220 and the three-dimensional color-painted layer 230. The cross-linking agent is selected from isocyanate series compounds, epoxy series compounds, amine series compounds or peroxide, which can be chosen according to the different materials of the adhesive layer 220 and the three-dimensional color-painted layer 230. The function of the cross-linking agent is to increase the chemical bonding ability between the adhesive layer 220 and the three-dimensional color-painted layer 230. The cross-linking agent is to cross-link the main chain molecules of materials, so that multiple linear molecules are bonded with each other to form covalent bonds or ionic bonds and cross-link them to be network structures, thereby improving the adhesion between the adhesive layer 220 and the three-dimensional color-painted layer 230.

Finally, the protective layer 240 is covered on the three-dimensional color-painted layer 230, which forms the color-painted substrate structure of the present embodiment for 200a.

In addition, the metal substrate 210 of the present embodiment can also include four sides, and the above-mentioned protective layer 240 or the adhesive layer 220 can completely cover the four sides of the metal substrate 210. Accordingly, the color-painted substrate structure 200a of the present embodiment will be more robust, which can prevent cracking or damage of the color-painted substrate structure caused by impact in the process of handling or disassembly.

In this embodiment, a material of the adhesive layer 220 or the protective layer 240 may be polyurethane paint, natural lacquer paint or epoxy resin. Furthermore, in some embodiments, the adhesive layer 220 or the protective layer 240 may also contain hardening agent or cross-linking agent. For example, the adhesive layer 220 may be mixed with a specific proportion of the cross-linking agent (e.g. 10-40% weight percentage) which will precipitate in the adhesive layer 220 due to different density. The mixing of the adhesive layer 220 and the cross-linking agent of the present embodiment can be carried out by spraying, digital spraying, screen printing, mask spraying or scraper planar coating, etc.

In the following, please refer to FIG. 4B, it illustrates a schematic diagram of a color-painted substrate structure of the fifth embodiment of the present invention. In this embodiment, the color-painted substrate structure 200b also includes a metal substrate 210, an adhesive layer 220, a three-dimensional color-painted layer 230 and a protective layer 240. The difference from the color-painted substrate structure 200a in the third embodiment of the present invention (referring to FIG. 4A) is that the spraying sequence of the coloring layer 234 and the banked layer 232 is different in the three-dimensional color-painted layer 230 of this embodiment.

The three-dimensional color-painted layer 230 of this embodiment includes a banked layer 232 and a coloring layer 234 formed on the banked layer 232, and the banked layer 232 has at least one raised part 232a. Specifically, the digital inkjet printing machine is used to spray a pigment material on the planar surface 222 of the adhesive layer 220 according to color and stereo structure of the three-dimensional (stereo) pattern set by the computer (application program) to form the coloring layer 234. In addition, after the spraying process of the coloring layer 234, the digital inkjet printing machine sprays a material on the coloring layer 234 according to the stereo structure of the three-dimensional pattern to form the banked layer 232 with at least one raised part 232a (that is, the stereo structure). Thus, the pattern presented by the three-dimensional color-painted layer 230 has the effect of three-dimensional relief. As the drop height of each raised part 232a on the banked layer 232 is changed, the pattern with hierarchical sense and rich color can be produced.

Finally, the protective layer 240 is covered on the three-dimensional color-painted layer 230, which forms the color-painted substrate 200b of the present embodiment.

Figure 4B:
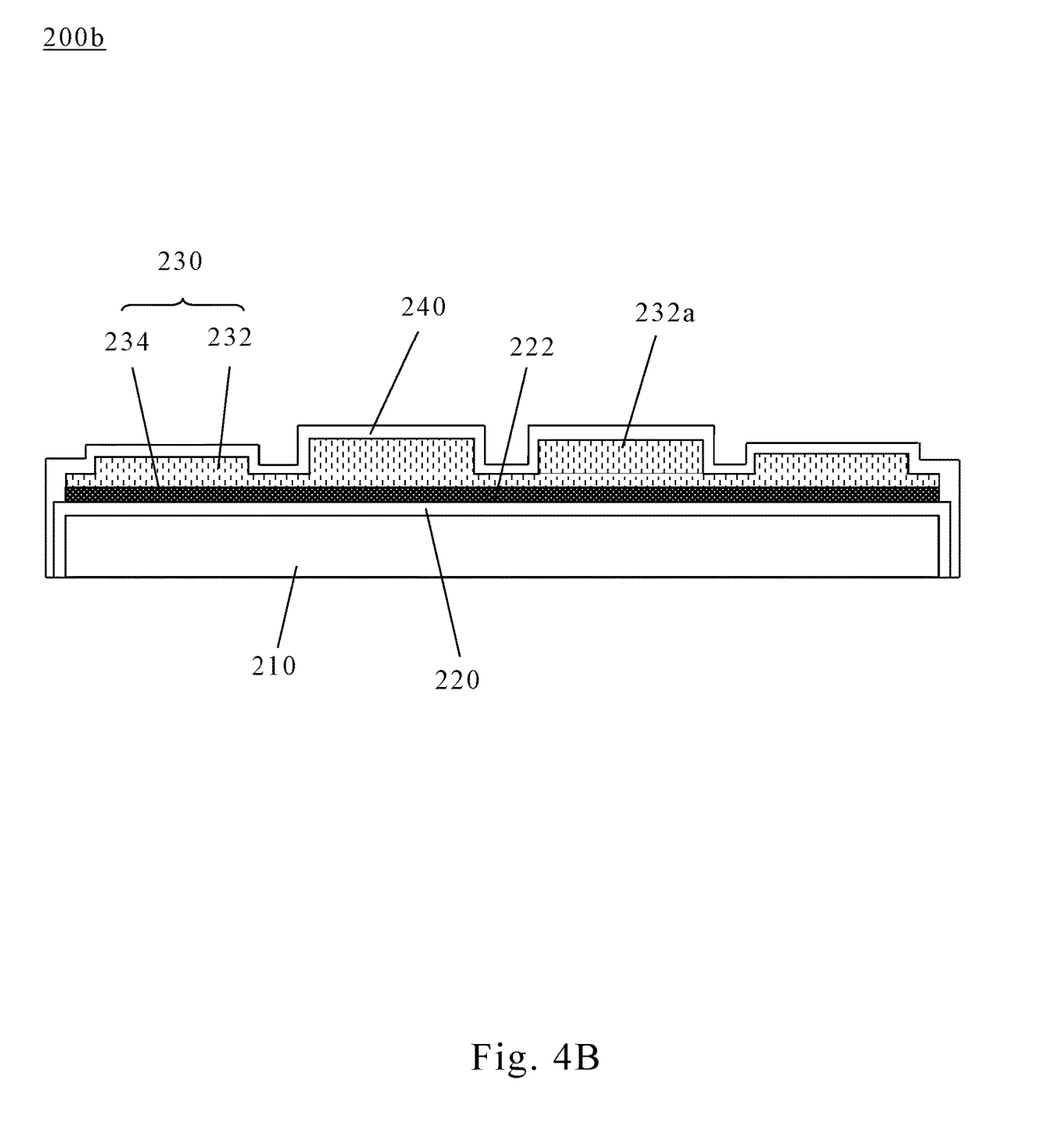
FIG. 4B illustrates a schematic diagram of a colorful board structure according to fifth embodiment of the present invention.
Figure 5:
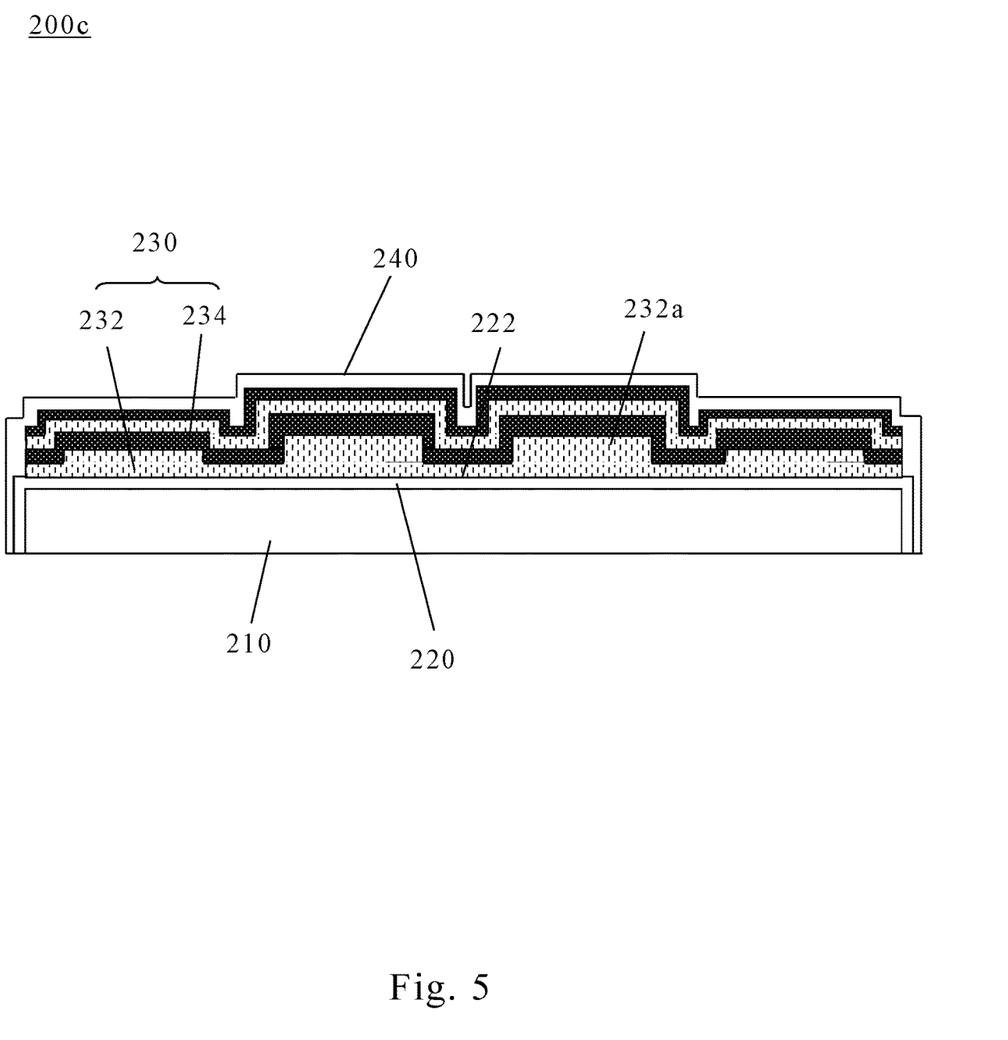
FIG. 5 illustrates a schematic diagram of a colorful board structure according to sixth embodiment of the present invention.

In addition, please refer to FIG. 5, it illustrates a schematic diagram of the color-painted substrate structure according to the sixth embodiment of the present invention. In this embodiment, the color-painted substrate structure 200c also includes a transparent substrate 210, an adhesive layer 220, a three-dimensional color-painted layer 230 and a protective layer 240. The difference between the color-painted substrate structure 200a and 200b (referring to FIGS. 4A and 4B) of the above embodiments of the present invention is that the three-dimensional color-painted layer 230 of the present embodiment includes a plurality of color-painted layers 234 and a plurality of banked layer 232, each of the plurality of color-painted layers 234 and plurality of banked layer 232 can interlace for stacking with each other.

In the three-dimensional color-painted layer 230 of the present embodiment, the three-dimensional color-painted layer 230 is stacked in order by a banked layer 232, a coloring layer 234, a banked layer 232 and a coloring layer 234, and each banked layer 232 has at least one raised part 232a. The stacking height (number of layers) can be adjusted according to the user's demands. In other embodiments, the three-dimensional color-painted layer 230 can also be stacked in order by a first coloring layer 234, a first banked layer 232, a second coloring layer 234 and a second banked layer 232 (not shown), and each banked layer 232 has at least one raised part 232a. Similarly, the stacking height (number of layers) can also be adjusted according to practical applications. The effect of stacking multiple banked layers 232 and coloring layers 234 is that the stacking of multiple coloring layers 234 with different color can improve the color performance of the color-painted substrate, while the banked layer 232 formed above or below the coloring layer 234 can effectively increase the stereoscopic sense of the substrate and make the pattern on the color-painted substrate more vivid.

At least one optical material can be added to the clear polishing paint layer (banked layer 232) and the protective layer 240 of the color-painted substrate structure in the fourth to sixth embodiment. The at least one optical material can be a quantum dot material, a luminescent material, a fluorescent material or the combination thereof, which further makes the color-painted substrate structure of the present invention have a luminescent effect.

Figure 6:
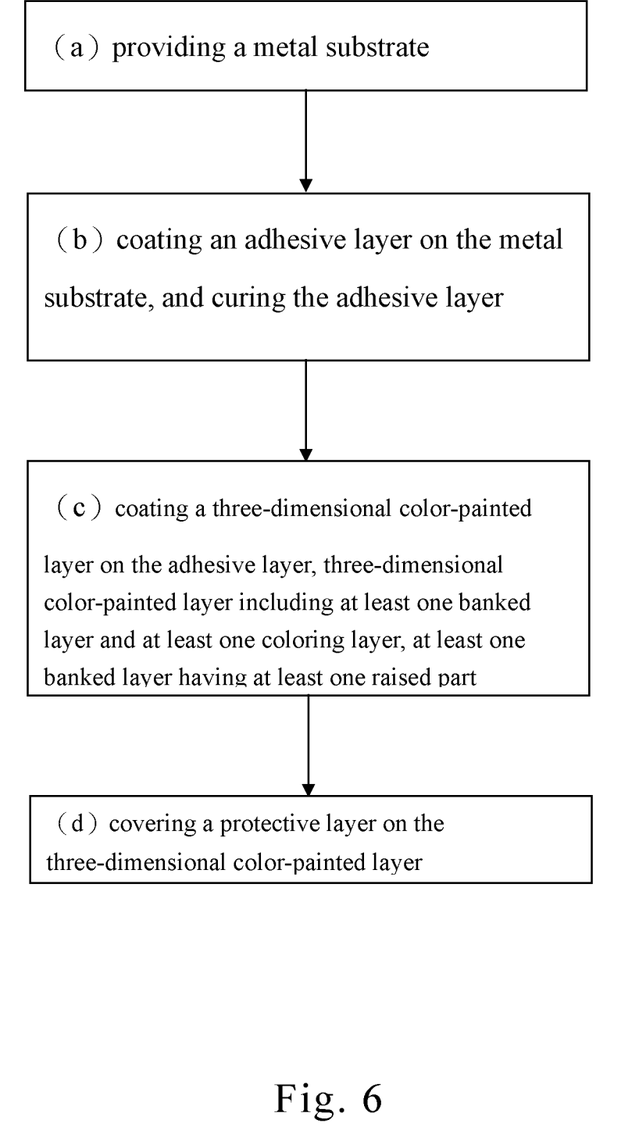
FIG. 6 illustrates a flow chart of manufacturing the colorful board structure according to another embodiment of the present invention.

Please also refer to FIG. 6, it illustrates a flowchart of the fabrication method of the color-painted substrate structure according to the fourth to sixth embodiments of the present invention.

As shown in FIG. 6, it illustrates the fabrication method of the color-painted substrate structures 200a and 200b of the fourth to sixth embodiments of the present invention (referring to FIG. 4A, FIG. 4B and FIG. 5). Firstly, a metal substrate 210 is provided by executing the step (a). Material of the metal substrate 210 can be selected from gold (Au), silver (Ag), copper (Cu), iron (Fe), aluminum (Al), stainless steel or galvanized steel sheet and other metal materials. Then, in the step (b), an adhesive layer 220 is coated on the metal substrate 210 to form a planar surface 222 and hardened by a curing (hardening) process. The curing (hardening) process in the step (b) can be performed by a light hardening or heat hardening in which curing agent is added into the adhesive layer 220. After hardening of the adhesive layer, the step (c) is executed, in which a three-dimensional color-painted layer 230 is coated on the adhesive layer 220. The three-dimensional color-painted layer 230 comprises at least one banked layer 232 and at least one coloring layer 234, in which each banked layer 232 has at least one raised part 232a.

In the step (c), the color and pattern of three-dimensional color-painted layer 230 can be obtained by spraying according to user's setting, and the spraying sequence and number of layers of the banked layer 232 and the coloring layer 234 can also be set according to user's requirements. For example, the banked layer 232 with at least one raised part (relief part) 232a is sprayed on the planar surface 222 of the adhesive layer 220, and then the coloring layer 234 is sprayed on the banked layer 232, which will make the color and pattern of the three-dimensional color-painted layer 230 more stereo and eye-catching (i.e. the color-painted substrate structure 200a of the fourth embodiment); as the coloring layer 234 is sprayed on the planar surface 222 of the adhesive layer 220, and then the banked layer 232 with at least one raised part (relief part) 232a is sprayed on the coloring layer 234, it can prevent the coloring layer from falling off when the user touches the color-painted substrate (i.e. the color-painted substrate structure 200b of the fifth embodiment). In other embodiments, the three-dimensional color-painted layer 230 may also be formed by stacking in order of a coloring layer 234, a banked layer 232, a coloring layer 234 and a banked layer 232.

Subsequently, the step (d) is performed for covering the protection layer 240 on the three-dimensional color-painted layer 230 to complete the fabrication of the color-painted substrate structures 200a and 200b according to the fourth and fifth embodiments of the present invention. The configuration of the protection layer 240 can be change according to the pattern of the three-dimensional color-painted layer 230. For example, the protection layer 240 is formed on the raised part of the three-dimensional color-painted layer 230 (i.e. the raised part 232a of the banked layer) to highlight the hierarchical sense of the three-dimensional color-painted layer 230. Moreover, the protection layer 240 can fill the depression area of the three-dimensional color-painted layer 230 such that the protection layer 240 and the raised part of the three-dimensional color-painted layer 230 (i.e. the raised part 232a of the banked layer) have an identical level to produce a planar layer with different effect. In addition, the protective layer 240 of the present embodiment has the functions of waterproof, chemical resistance, scratch resistance and anti-ultraviolet. It is helpful to keep bright and non-fading of the stereo pattern presented by the three-dimensional color-painted layer 230.

Furthermore, the banked layer 132 and the protection layer 140 includes at least one optical material, which may be a quantum dot material, a noctilucent material, a fluorescent material or the combination thereof. The optical material can be formed on the surface of at least one the banked layer or the protection layer by a liquid atomizer, or doping in at least one the banked layer or the protection layer, or by spin coating process and photolithography process to cover the optical material on at least one the banked layer or the protection layer to obtain a specific pattern of the optical material deposition.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure. While the preferred embodiment of the invention has been illustrated and described, it will be appreciated that various changes can be made therein without departing from the spirit and scope of the invention.

What is claimed is:

1. A colorful board structure, comprising:
   a metal substrate;
   an adhesive layer formed on said metal substrate;
   a three-dimensional color-painted layer formed on said adhesive layer, wherein said three-dimensional color-painted layer includes at least one banked layer and at least one coloring layer, and each of said at least one banked layer includes at least one raised part; and
   a protection layer covered on said three-dimensional color-painted layer;
   wherein said banked layer is a clear polishing paint layer;
   wherein said at least one banked layer is formed on or under the at least one coloring layer;
   wherein the at least one raised part matches with certain pigment of the at least one coloring layer, determining by same stereo pattern;
   wherein the stereo pattern comprises a stereo structure and a pattern color;
   wherein the at least one raised part is determined by the stereo structure and the certain pigment of the at least one coloring layer is determined by the pattern color;
   wherein the at least one raised part and the certain pigment of the at least one coloring layer are printed by a digital inkjet printer.

2. The structure of claim 1, wherein said at least one banked layer is formed on said at least one coloring layer or said at least one coloring layer is formed on said at least one banked layer.

3. The structure of claim 1, wherein said at least one banked layer interlaces for stacking with said at least one coloring layer.

4. The structure of claim 1, wherein said metal substrate includes a magnetic material.

5. The structure of claim 1, wherein a cross-linking agent or a hardening agent is added into said adhesive layer.

6. The structure of claim 1, wherein said clear polishing paint layer and said protective layer include at least one optical material.

7. The structure of claim 6, wherein said at least one optical material includes a quantum dot material, a luminescent material, a fluorescent material or the combination thereof.

* * * * *